Jan. 22, 1952  S. BAKEWELL  2,583,199
MEAT TENDERIZING DEVICE
Filed Nov. 13, 1948

INVENTOR.
SIDNEY BAKEWELL.
BY
ATTORNEY.

Patented Jan. 22, 1952

2,583,199

UNITED STATES PATENT OFFICE 2,583,199

MEAT TENDERIZING DEVICE

Sidney Bakewell, Detroit, Mich.

Application November 13, 1948, Serial No. 59,960

3 Claims. (Cl. 17—26)

This invention relates to meat tenderizing devices the object being to provide a series of plates of circular form having a toothed periphery and arranged on parallel shafts and the meat or other substance to be treated is to be passed between the toothed elements whereby the fibers in the meat are severed and the meat itself subjected to pressure and the cutters on one shaft having a peripheral edge between the cutters on the other shaft.

These and other features and objects of the invention are hereinafter more fully described and claimed and the preferred form of the invention is shown in the accompanying drawing in which—

Figure 1:
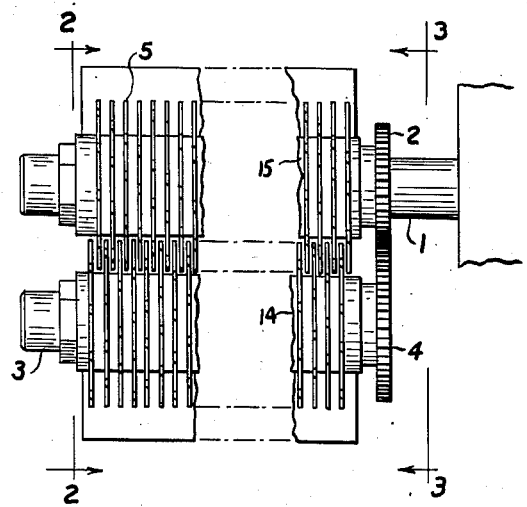
Fig. 1 is a plan view of the meat disintegrating apparatus.

The device comprises a driving shaft 1 connected with a driving element not here shown. On this shaft is a gear 2 and on a parallel shaft 3 is a gear 4 of greater diameter than and connected with the gear 2. Thus the shaft 1 rotates at a higher rate of speed than the shaft 3. On the shaft 1 is a series of toothed discs 5 in spaced relation and on the shaft 3 is a similar series of discs in spaced relation, the periphery of the discs on one shaft extend to between the discs on the other shaft. Each of the shafts has four grooves 6 and each of the discs has a central aperture and a lug 7 engaging in the groove.

Figure 2:
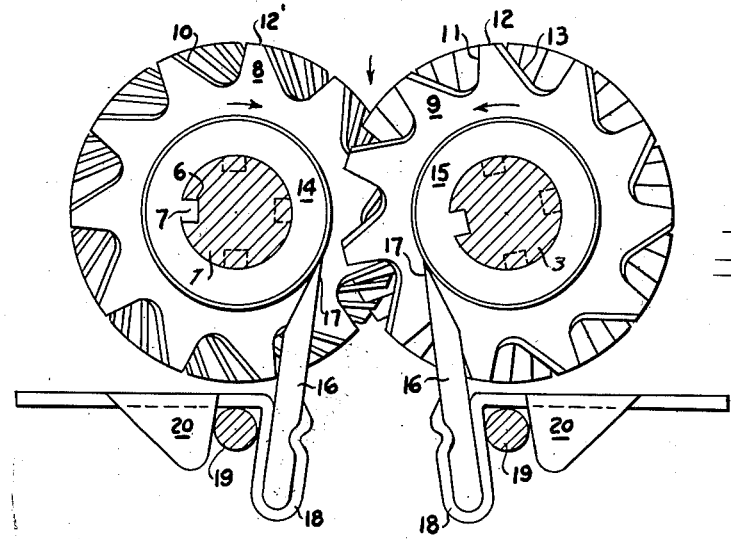
Fig. 2 is a section taken on line 2—2 of Fig. 1.
Figure 3:
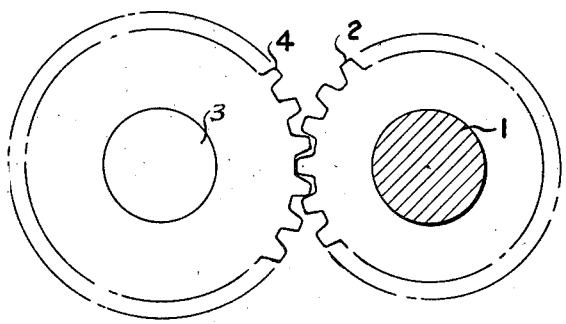
Fig. 3 is a section taken on line 3—3 of Fig. 1 showing the gears on the respective shafts.

By this arrangement the teeth of the successive cutters on either shaft are arranged in spiral relation and the teeth 8 of the cutters on one shaft lie between the teeth 9 of the cutters on the other shaft and thus provide a spiral groove as will be understood from Fig. 2.

The meat to be tenderized, as for instance a steak, is introduced between the cutters in the direction of the arrow shown in Fig. 2 which, in passing therethrough, is slitted on one side by the angularly inclined sharpened leading radial edge 10 of one cutter and on its opposite side by the angularly inclined sharpened trailing edge 13 of the other cutter. The teeth have blunt ends 12 on one cutter and 12' on the other. The teeth of each of the cutters have sharp edges which tend to slit the meat due to the difference in speed of rotation and the blunt ends of the teeth compress the meat between the ends thereof and the spacer elements 14 and 15 of the respective shafts.

There are strippers 16 one for each spacer element each having a sharp edge 17 which engages the periphery of the respective corresponding spacer element between the cutters to prevent an accumulation of meat therebetween. These strippers are positioned in a holder 18 and are mounted on the spaced shafts 19 and held from lateral displacement by the flanges 20 of the respective holders which bear against the opposite sides of shafts 19 and prevent accumulation of meat between the cutter elements on each of the shafts.

The gear 2 on the shaft 1 being of less diameter than the gear 4 on the shaft 3, shaft 1 rotates at a greater speed than shaft 3 and by this arrangement the sharp edges of the teeth tend to slit the meat at successive points in the surface thereof. The sharp edges 10 of the teeth 8 are oppositely inclined in respect to the sharp edges 13 of the teeth at the moment a portion of meat is engaged therebetween.

By this arrangement of parts the blunt ends of the cutter teeth compress the meat between the ends 12 and 12' thereof and the spacer elements 14 and 15 on the shaft 3 and 1 respectively, so that the meat is compressed and lacerated. In view of the difference of the speeds of rotation of shafts 1 and 3 there is also a relative shearing action between sharp edges of opposing teeth. The leading edge 11 of the teeth 9 is plain, and corresponds to the similar trailing edge of the teeth 8.

It is to be understood that the device is not limited to the processing of meat as vegetables or other material may be treated in like manner.

Having thus briefly described my invention, its utility and mode of operation, what I claim and desire to secure by Letters Patent of the United States is:

1. A device for tenderizing meat and other substances comprising parallel spaced driving and driven shafts, intermeshing gears of different size secured on said shafts respectively whereby one shaft rotates faster than the other, a series of toothed discs longitudinally spaced and secured upon said shafts, with the discs of one shaft alternately spaced from the discs of the other shaft and with the teeth thereof arranged in overlapping relation, the teeth having blunt outer ends, the teeth of one series of discs having an angularly inclined sharpened leading radial edge, and the teeth of the other series of discs having an angularly inclined sharpened trailing radial edge, whereby the meat downwardly threaded between said shafts is compressed and lacerated upon opposite sides, there being a shearing action between adjacent opposed teeth due to the variation in speed of shaft rotation.

2. A device for tenderizing meat and other substances comprising parallel spaced driving and driven shafts, intermeshing gears of different size secured on said shafts respectively whereby one shaft rotates faster than the other, a series of toothed discs longitudinally spaced and secured upon said shafts, with the discs of one shaft alternately spaced from the discs of the other shaft and with the teeth thereof arranged in overlapping relation, the teeth having blunt outer ends, the teeth of one series of discs having an angularly inclined sharpened leading radial edge, and the teeth of the other series of discs having an angularly inclined sharpened trailing radial edge, whereby the meat downwardly threaded between said shafts is compressed and lacerated upon opposite sides, there being a shearing action between adjacent opposed teeth due to the variation in speed of shaft rotation, the discs on each shaft being so rotatably positioned and secured thereon relative one to the other whereby the successive teeth of the discs on each shaft provide a plurality of spaced spiral grooves for each series of discs, the spiral grooves of each series of discs between the two shafts intersecting each other in changing relation as said shafts rotate.

3. A device for tenderizing meat and other substances comprising parallel spaced driving and driven shafts, intermeshing gears of different size secured on said shafts respectively whereby one shaft rotates faster than the other, a series of toothed discs longitudinally spaced and secured upon said shafts, with the discs of one shaft alternately spaced from the discs of the other shaft and with the teeth thereof arranged in overlapping relation, the teeth having blunt outer ends, the teeth of one series of discs having an angularly inclined sharpened leading radial edge, and the teeth of the other series of discs having an angularly inclined sharpened trailing radial edge, whereby the meat downwardly threaded between said shafts is compressed and lacerated upon opposite sides, there being a shearing action between adjacent opposed teeth due to the variation in speed of shaft rotation, the discs on each shaft being so rotatably positioned and secured thereon relative one to the other whereby the successive teeth of the discs on each shaft provide a plurality of spaced spiral grooves for each series of discs, the spiral grooves of each series of discs between the two shafts intersecting each other in changing relation as said shafts rotate, said shafts each having a plurality of longitudinally extending radially spaced slots, and said discs being centrally apertured and having a radial inwardly directed lug cooperable with one of said slots whereby said discs may be selectively adjusted rotatively with respect to an adjacent disc and slid and secured upon said shafts respectively, and apertured spacers on said shafts between each adjacent pair of discs.

SIDNEY BAKEWELL.

REFERENCES CITED

The following references are of record in the file of this patent:

UNITED STATES PATENTS

| Number | Name | Date |
|---|---|---|
| 493,103 | Mathews | Mar. 7, 1893 |
| 536,464 | Friesz | Mar. 26, 1895 |
| 776,945 | Riedel | Dec. 6, 1904 |
| 803,526 | Cunning | Oct. 31, 1905 |
| 2,143,123 | Erickson | Jan. 10, 1939 |
| 2,409,463 | Ahrndt | Oct. 15, 1946 |